(12) United States Patent
Nufer et al.

(10) Patent No.: US 7,560,651 B2
(45) Date of Patent: Jul. 14, 2009

(54) ELECTRONIC BALANCE

(75) Inventors: Bruno Nufer, Illnau (CH); Siegfried Zeiss, Wolfhausen (CH)

(73) Assignee: Mettler-Toledo AG, Greifensee (CH)

( * ) Notice: Subject to any disclaimer, the term of this patent is extended or adjusted under 35 U.S.C. 154(b) by 9 days.

(21) Appl. No.: 11/907,051

(22) Filed: Oct. 9, 2007

(65) Prior Publication Data

US 2008/0087474 A1    Apr. 17, 2008

(30) Foreign Application Priority Data

Oct. 11, 2006   (EP) .................................. 06122083
Apr. 10, 2007   (DE) ....................... 10 2007 017 103

(51) Int. Cl.
*G01G 21/28* (2006.01)

(52) U.S. Cl. ....................................... 177/145; 177/180

(58) Field of Classification Search .................. 177/145, 177/180
See application file for complete search history.

(56) References Cited

U.S. PATENT DOCUMENTS

| 4,719,980 | A | 1/1988 | Knothe et al. |
| 6,420,666 | B1 | 7/2002 | Baumeler et al. |
| 7,227,087 | B2 * | 6/2007 | Luechinger .................. 177/180 |
| 7,227,088 | B2 * | 6/2007 | Luechinger et al. ......... 177/180 |
| 2002/0040815 | A1 | 4/2002 | Luchinger |
| 2006/0137915 | A1 * | 6/2006 | Luechinger .................. 177/180 |

FOREIGN PATENT DOCUMENTS

| DE | 36 01 408 C1 | 3/1987 |
| DE | 100 32 398 A1 | 2/2001 |
| EP | 1 195 584 A1 | 4/2002 |

OTHER PUBLICATIONS

European Search Report dated Mar. 5, 2007.

* cited by examiner

*Primary Examiner*—Randy W Gibson
(74) *Attorney, Agent, or Firm*—Buchanan Ingersoll & Rooney PC (57) ABSTRACT

Electronic balance with a load carrier, further with a transfer device cooperating with the load carrier, with a draft shield enclosing a weighing compartment that is adapted to the dimension of an object to be weighed and comprises at least one closure element serving to open and close at least one loading access opening, and also with a drive mechanism serving to actuate the closure element, characterized in that the drive mechanism further comprises a position-setting member, wherein the drive mechanism together with the position-setting member and a displacement-transmitting element causes a lifting- and lowering movement of the transfer device relative to the load carrier, and wherein the position-setting member is configured for setting the transfer device and/or the load carrier into several defined positions.

21 Claims, 7 Drawing Sheets

ELECTRONIC BALANCE

RELATED APPLICATIONS

This application claims priority under 35 U.S.C. §119 to European Patent Application No. 06122083.6 filed in the European Patent Office on Oct. 11, 2006, and to German Patent Application No. 102007017103.1 filed in Germany on Apr. 10, 2007, the entire contents of which are hereby incorporated by reference in their entireties.

TECHNICAL FIELD

An electronic balance with a draft shield, in particular an automated arrangement for placing a weighing object on the load carrier of the balance and also a weighing compartment of the electronic balance that comprise an inset and a loading access opening that can be closed off by a closure element.

BACKGROUND INFORMATION

A draft shield is an important element particularly in balances that are designed to weigh the most minute loads, for example in the microgram range or even in the sub-microgram range, because in these load ranges the smallest changes for example in the air flow, the buoyancy, or due to temperature changes and/or shocks can have a significant influence on the weighing result. To minimize these influences, it is usually necessary, after a weighing object has been placed on the balance, that the actual weighing is carried out with a certain time delay to allow primarily the air enclosed in the weighing compartment to come to rest and to also ensure that all other extraneous parameters are as constant as possible. This improves the measurement accuracy, but the time interval for a measurement is considerably lengthened, so that in particular multiple measurements or verification measurements of weighing loads or weighing objects of the same kind will take an unduly long time.

Furthermore, when placing a weighing object on the balance, care should be taken to avoid putting any additional pressure or force on the load carrier when the load is placed on the balance, as the load carrier is connected to the weighing mechanism and the latter can be damaged or even destroyed by an excessively strong and/or uncontrolled application of force. For example, if the load is put manually on a highly precise balance by means of a pair of tweezers, the repeatability of a measurement can be influenced, because the mechanical forces applied or generated are of different magnitude every time a load is placed on the load carrier.

Electronic balances of the known state of the art, for example laboratory balances, analytical balances or microbalances are equipped with different versions of draft shields depending on the area of application, in substantially angular as well as round configurations, which normally have at least one access opening through which the load is put on the balance and which can in most cases be closed.

One application among others for high-precision balances, so-called microbalances, is for check-weighing small tube- or rod-shaped weighing objects, such as for example stents for vascular surgery applications. In applications of this kind, as many objects of the same type as possible need to be weighed one after another in the shortest possible time. Other applications can include for example also the check-weighing of certain articles or the monitoring of weight fluctuations of one or more weighing objects over a certain time span, for example in quality assurance.

High-precision balances are no longer used exclusively in the laboratory but to a growing extent also in the serial production of very small articles such as stents, filters, implants, computer chips and the like. In particular in production, a balance must meet on the one hand the requirement that it guarantees the required measurement accuracy and rapidly delivers reproducible results, while on the other hand it has to be robust and simple to operate.

The requirements imposed on the design of the balance and in particular on parts that can be brought into contact with a weighing object, are becoming constantly more stringent, particularly in areas of application that are subject to strict legal constraints, such as for example in medicine, biochemistry, or in pharmaceutics. One of these requirements is for example that the parts of the balance that come into contact with a weighing object, in particular the weighing compartment, are easy to clean.

It is for example possible that a closure element which serves to open or close the weighing compartment, or also the inside of the weighing compartment, come into contact with the weighing object, for example if the weighing object falls off the load-receiving device or, in the process of being brought into the weighing compartment, comes into contact with the closure element.

It would therefore be advantageous if these components, too, could be easily cleaned and cleared of residues through physical and/or chemical methods, as well as sterilized if necessary, so that they satisfy at least the legal requirements for cleanliness and/or hygiene in different fields of application.

SUMMARY

To increase the user-friendliness of a balance, for additional protection of the weighing mechanism when placing a weighing load on the balance, as well as to shorten the measurement times and improve the reproducibility and repeatability of a measurement, in particular when measuring a large number of weighing objects of the same kind or for multiple weighings of the same article, an electronic balance, in particular a microbalance, can be equipped with a draft shield which encloses a weighing compartment designed to accommodate the dimensions of the weighing objects and comprises at least one closure element serving to open and/or close at least one access opening to bring in and take out the weighing load. A balance according to the disclosure further comprises a load carrier, a transfer device that cooperates with the load carrier, and a drive mechanism to actuate the closure element. The drive mechanism further comprises a position-setting member and, by acting through the position-setting member and a displacement-transmitting element which can be arranged in the transfer device, effects a vertical movement of the transfer device relative to the load carrier. The position-setting member is designed with the ability to position the transfer device and/or the load carrier in several defined positions.

The dimensions of the weighing compartment and thus of the draft shield are matched in such a way to the objects that are to be weighed that the total volume of the weighing compartment is only slightly larger than the volume occupied by the weighing objects. Depending on the weighing objects, the shape of the weighing compartment can essentially be polygonal, e.g., rectangular, or also substantially round or oval. This also automatically results in a reduction of the air volume contained in the weighing compartment, and as a consequence the time can be reduced for extraneous parameters to settle to a constant level, including among others the barometric pressure, air turbulence, and atmospheric moisture. The concept of adapting the weighing compartment to the dimensions of an object to be weighed is particularly advantageous as a means to improve the reproducibility and to shorten the measurement times for multiple weighings of the same object or for weighings of a large number of objects of the same kind.

To protect the weighing mechanism as well as to ensure a controlled movement for loading a weighing object on the load carrier or lifting the object off the load carrier, the balance comprises a transfer device which, while being movable relative to the load carrier and capable of exchanging a weighing load with the latter, has no direct force-transmitting contact with the load carrier.

The movement of the transfer device relative to the load carrier as well as the controlled opening and/or closing of the access opening to bring in and take out the load is actuated by the drive mechanism, with the movement of the transfer device and the opening and/or closing of the closure element being coupled to each other.

The access opening for the weighing load can be equipped with a suitable closure element which can be opened and/or closed. The closure element can be constrained for example to swivel about an axis or a point of rotation or it can be guided for sliding movement. Especially a sliding constraint or a swivel movement about a point of rotation is advantageous because air puffs of the kind that are caused for example when closing a hinged gate and that can affect the weighing object are largely avoided. The movement of the closure element is coupled to the movement of the transfer device relative to the load carrier to ensure that the weighing compartment is open only when moving a weighing object in or out.

Based on the design of the position-setting member, the transfer device can be set at different defined positions relative to the load carrier, specifically three positions. Possible configurations of the position-setting member include different kinds of cam disks, eccentrics as well as a linear-displacement sliding element.

Depending on the configuration of the position-setting member, the displacement-transmitting element serves to convert the movement of the position-setting member into a linear vertical movement of the transfer device in relation to the load carrier. The displacement-transmitting element can be connected to the transfer device or arranged on the latter.

During a measurement and also while the load carrier is being loaded, the weighing compartment, in particular the access opening for loading the weighing objects, should be closed. Besides the object being weighed, at least a part of the transfer device as well as a part of the load carrier will be arranged inside the weighing compartment during a measurement.

The load carrier comprises a first load-receiving device and the transfer device comprises a second load-receiving device. The load-receiving devices are configured so that when the load carrier moves in relation to the transfer device, one load-receiving device moves into and through the other without mutual contact between the two load-receiving devices while transferring a load to be weighed.

In an exemplary embodiment, the load-receiving devices have fork- or tine-shaped projections arranged in such a way that the first and the second load-receiving device can be moved past each other or, more specifically, through each other. As soon as a weighing object is placed on one of the two load-receiving devices, it can be transferred from one load-receiving device to the other as one load-receiving device moves through the other or reaches through the other, respectively, to pick up the object. Further exemplary embodiments of the load-receiving devices can include among other configurations plate-like structures with needle- or pin-like seating elements and/or they can also be based on state-of-the-art solutions.

An automated mode of loading and/or removing an object on the load carrier as well as a weighing compartment that is adapted for a specific kind of weighing object is of particular advantage for the weighing of goods in the microgram- or sub-microgram range, so that it suggests itself to equip a so-called microbalance accordingly.

Known microbalances, for example the Mettler-Toledo model UMX2, are equipped in part with an exchangeable draft shield. Consequently, it is advantageous to create a draft shield in accordance with the disclosure which is simple to combine with an existing balance and which may even replace a standard draft shield, as this gives the user a high degree of flexibility in using the balance.

The electronic balance can further comprise a weighing compartment with an inset and a loading access opening that can be closed off by a closure element. While the weighing is taking place, i.e. during a weighing process, the first load-receiving device and the second load-receiving device are arranged inside the weighing compartment, specifically in the inset. The inset and/or the closure element can be exchanged manually or in an automated mode.

The desired easy cleaning of the parts of the balance that come into contact with the weighing object thus imposes the requirement for those parts to be easy and problem-free to remove and to install, and it should of course be possible to perform the exchange without compromising the quality of the measurement result and without affecting or damaging the individual parts or the weighing mechanism. Depending on the field of application and the sensitivity of the balance, it is advantageous if the exchange of the parts that could possibly come into contact with the weighing object can occur manually and/or automatically.

The closure element comprises at least one coupling part which serves to connect the closure element to the balance and in particular to the draft shield. As a counterpart to the coupling part, the balance comprises at least one recess designed to receive the coupling part. An exemplary balance comprises two recesses to receive two coupling parts. The one or more recesses can be arranged for example on the housing of the balance or on the draft shield. The coupling part can be secured in the at least one recess with a latching device, so that the closure element comprises a releasable connection to the balance.

With regard to exchanging the closure element, a particularly user-friendly kind of closure element comprises two coupling parts, particularly in combination with a latching device with a rotatably fastened bar or latch that can open or close the recesses to that the closure element can be secured or removed and reinstalled.

A closure element with a single, for example rod-shaped coupling part can be secured by a latch configured as a sliding element, in which case the direction of movement of the sliding element can be perpendicular to the longitudinal axis of the coupling part.

For a simple insertion or removal of the inset, the weighing compartment can have at least one cutback area arranged in the weighing compartment in such a way that a gap is left between the weighing compartment wall and the insert where a gripping element such as pair of tweezers or an automated gripper element can get a hold on the inset and take it out of, or set it into, the weighing compartment.

A further exemplary embodiment can include a grip element arranged in or on the inset. The shape of the grip element can be adapted to the shape of an instrument that is intended to be used for the exchange, for example an eyelet which can be gripped by a hook or a pair of tweezers. Further exemplary embodiments can include for example magnetic grips or specially shaped eyelets or hooks.

The inset and/or the closure element can be made of a material that is easy to clean and resistant to chemicals. Depending on the area of application, they can in addition be provided with surface coatings. Suitable materials include high-grade stainless steels, precious metals, aluminum, titanium, or combinations of these metals.

Due to their design, the load-receiving devices, the closure element and the inset are easy to exchange and to clean, which is of particular interest for medical, pharmaceutical, and biochemical applications. Depending on the practical situation, the user can exchange the parts for example after each measurement or in given time intervals.

An exemplary automated loading of a load carrier of an electronic balance with a draft shield that encloses a weighing compartment which is matched to a weighing object and comprises at least one closable access opening for the load, with a drive mechanism that actuates the closure element and further comprises a position-setting member, and with a transfer device that cooperates with the load carrier as well as, through a displacement-transmitting element, with the position-setting member, can have several steps.

First, the access opening for the load is opened by actuating the closure element, while at the same time a first position is set between the load carrier and the transfer device through a relative movement between them. In the first position, the object to be weighed can be set on the transfer device, or more specifically on the load-receiving device connected to the latter.

Next, the access opening for the load is closed and at the same time a second position, the zero position, is set between the load carrier and the transfer device through a relative movement between them. In this position, a zero-balancing step is performed in the balance, or a zero reference value is entered into the balance. Before and/or after the zero-setting, a verification of the proper functioning of the balance and of the weighing parameters can be performed. This verification can include for example a calibration of the balance with a built-in calibration weight, a tare cancellation, an adjustment, a test of the barometric pressure or other parameters in the weighing compartment, and/or the setting of different parameters by the user.

After this test has been completed, the weighing object can be transferred from the transfer device to the load carrier by a further relative movement of the load carrier towards the transfer device, where in this phase the load-receiving devices pass through each other without contact, whereupon the object is weighed. The load carrier and the transfer device are now in a third position, i.e. the weighing position.

After the measurement has been completed, the weighing object is transferred back to the transfer device, going through the reverse sequence of movements of the load carrier relative to the transfer device.

The checking of the weighing parameters, the loading of the weighing object on the load carrier, the weighing as well as the lifting off of the weighing object can be repeated until a prescribed number of weighings has been carried out. Subsequently, the access opening for the load is opened again and the first position between the load carrier and the transfer device is set through a relative displacement of the two in relation to each other, so that the weighing object can be removed from the transfer device. The placing of a weighing object on the transfer device and/or the removing of a weighing object from the transfer device can occur manually as well as in an automated mode, for example by means of a suitable robot or another known device.

The opening and closing of the access opening for the load by the closure element is actuated directly and/or indirectly by the drive mechanism which in cooperation with the position-setting member and the displacement-transmitting element also effects the setting of at least the first, second and third positions between the load carrier and the transfer device. Depending on the design of the closure element and the position-setting member it is also possible to use different drive mechanisms under a coordinated control for the position-setting member and the closure member.

BRIEF DESCRIPTION OF THE DRAWINGS

Different exemplary embodiments of an electronic balance with a draft shield are explained hereinafter with references to the drawings, in which the same reference symbols are used from one drawing to the next for identical elements, and wherein:

FIG. 12 (*a*) represents a detail view of a latching arrangement for connecting a closure element to an electronic balance with two recesses in an open position.

FIG. 12(*b*) represents a detail view of a latching arrangement for connecting a closure element to an electronic balance with one recess in a closed position.

FIG. 13 represents a perspective view of a closure element with two coupling areas.

DETAILED DESCRIPTION

Figure 1:
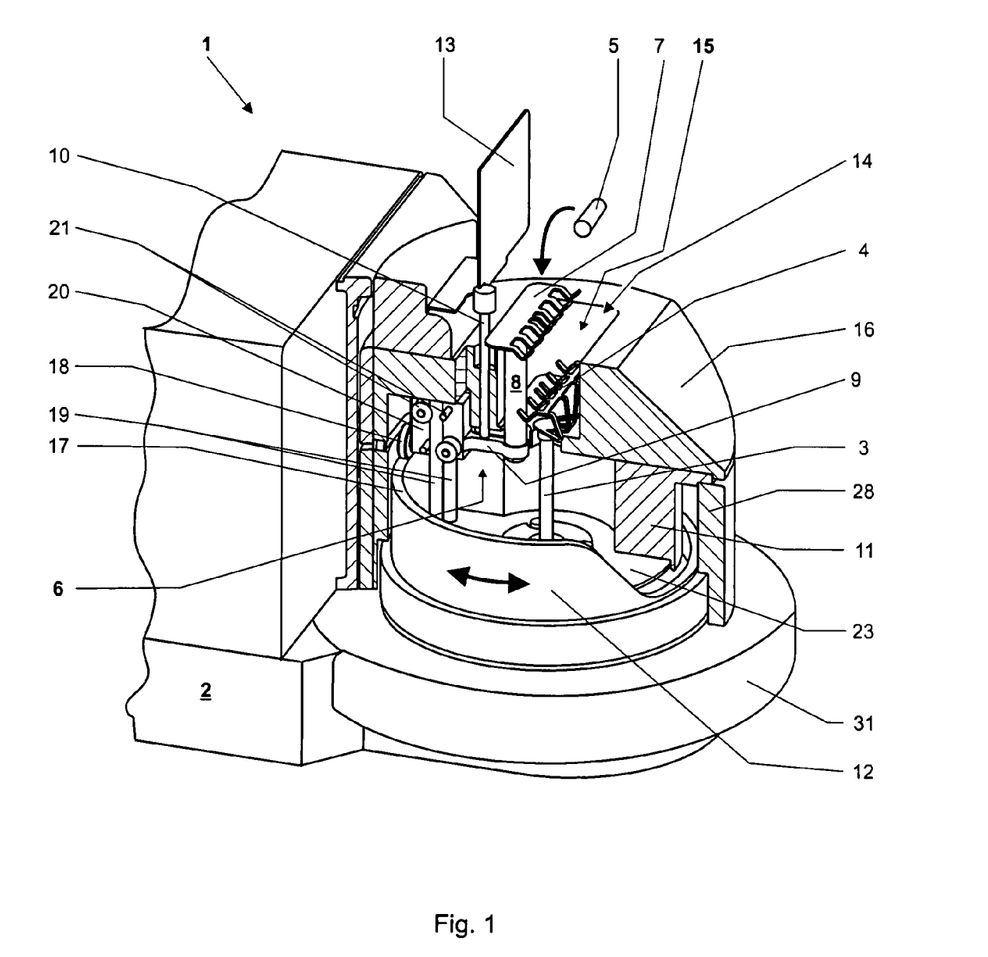
FIG. 1 represents a partial view of an electronic balance with a first draft shield shown in cross-section, with the access opening for the load in the open condition, and with a transfer device and a load carrier occupying a first position relative to each other.

FIG. 1 shows part of an electronic balance 1 in a sectional view. The balance 1 has a housing 2 containing, among other elements, the weighing mechanism which is connected to a load carrier 3. The load carrier 3 has at its free end a first load-receiving device 4 for the weighing object 5. The housing 2 of the balance 1 has a projecting floor element 31 on which a position-setting member 12 is arranged which has the shape of a cylinder of circular cross-section and a base plate with a passage located at its center for the load carrier 3 and with an end border 17 configured as a cam disk. The position-setting member 12 represents a part of a drive mechanism which further includes a gear mechanism arranged in the floor element 31 and a motor arranged in the housing 2. The position-setting member is arranged with the ability to rotate on the floor element 31.

As a protective measure against dirt, the position-setting member 12 is shielded by a wall element 28 which is fastened between the floor element 31 and a draft shield 16.

Figure 5:
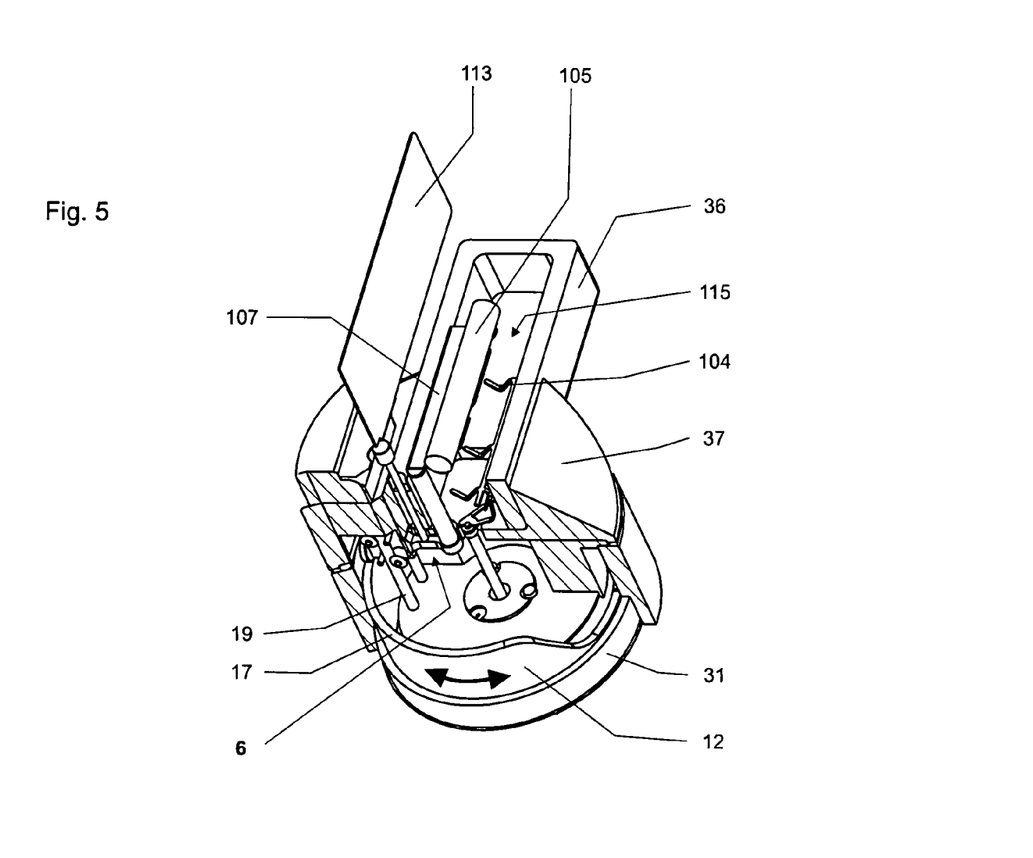
FIG. 5 represents a partial view of an electronic balance with a second draft shield shown in cross-section, with the access opening for the load in the open condition, and with a transfer device and a load carrier occupying a first position relative to each other.

Arranged inside the cylindrical position-setting member 12 is a support structure (see FIG. 5). This support structure includes a floor plate 23 with a passage for the load carrier 3. Attached to the floor plate 23 are two spaced-apart guide rods 19, whose free ends normally reach above the border 17 of the position-setting member 12. The guide rods 19 serve as vertical guides for a transfer device 6.

On the floor plate 23, a further wall element 11 is arranged which serves as an additional support for the draft shield 16. The wall element 11 has a substantially cylindrical shape with a cutout facing towards the housing 2, in which the guide rods 19 are arranged and along which the position-setting member 12 is moved.

The transfer device 6 consists of a guide block 20 that is arranged between the guide rods 19, a horizontal support 9 and connected to the latter a vertical support 8. The free end of the vertical support 8 carries a second load-receiving device 7 for the weighing object 5.

Arranged on each of two opposite sides of the guide block 20 are gliding means in the form of a roller and a pin, between which the guide rods 19 are extending. The gliding means 21 allow a largely frictionless vertical movement of the transfer device along the guide rods 19.

Furthermore, a displacement-transmitting element 18 is mounted on the guide block 20. The displacement-transmitting element 18 in this exemplary embodiment is a roller wheel which rolls along the border 17 of the position-setting member 12 when the latter moves past the transfer device 6.

Above the wall elements 11, 28, the draft shield 16 extends, enclosing a weighing compartment 15. The floor of the weighing compartment 15 has at least one passage for the load carrier 3 as well as for the vertical support 8 of the transfer device 6. The weighing compartment 15 further has a loading access opening 14 which can be closed by a movable closure element 13 in the form of a hinged cover. The closure element 13 can be swiveled or tipped up and down about an axle on the side near the housing 2.

FIG. 1 shows a first position, i.e. the loading position, between the load carrier 3 and the transfer device 6, where the load-receiving devices 4, 7 are at a maximum vertical distance from each other and the position-setting member 12 is oriented so that the displacement-transmitting element 18 is located in a part of the border 17 where the position-setting member has its greatest vertical height.

In this position, where the weighing compartment 15 is open, the weighing object 5 can be put on or off the load-receiving device 7 of the transfer device 6 without causing an additional force to be introduced into the load carrier 3. The closure element 13 is opened up and held open by the rod 10 which is fastened to the horizontal support 9. The drive mechanism causes a vertical movement of the transfer device 6 as well as a vertical movement of the rod 10, so that the latter, when it moves against the direction of the load, is pushed from below against the closure element 13, whereby the closure element 13, i.e. the access opening for the load, is opened up. When the force acting against the load direction on the closure element 13 is removed, the access opening for the load is closed again.

Figure 2:
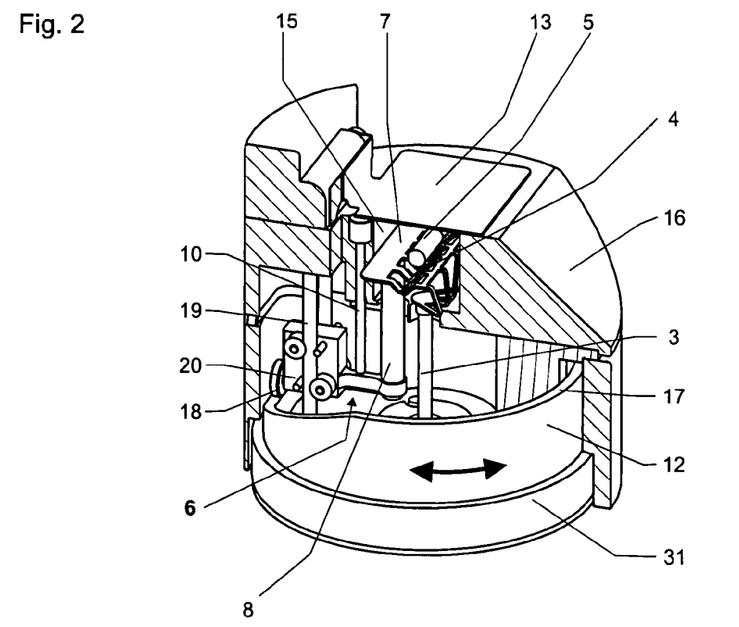
FIG. 2 represents a partial view of an electronic balance with a first draft shield shown in cross-section, with the access opening for the load in the closed condition, and with a transfer device and a load carrier occupying a second position relative to each other.

FIG. 2 represents a part of FIG. 1 and illustrates a second position, the zero position, between the load-receiving devices 4 and 7 of the load carrier 3 and the transfer device 6. The weighing compartment 15 is closed off by the closure element 13.

A change from the first to the second position is caused by a rotary movement of the position-setting member 12 along the transfer device 6. The position-setting member 12 is turned to pass by the transfer device 6 and the guide rods 19. In this movement, the displacement-transmitting element 18 follows the curved contour of the border 17, whereby the transfer device 6 is lowered in the direction of the load and approaches the load carrier 3. The position-setting member is configured so as to guide the displacement-transmitting element 18 in a fluid and substantially jolt-free movement, so that the result is a fluid and substantially jolt-free vertical movement of the transfer device 6. In a change from the first to the second position, the weighing compartment 15 is closed at the same time by the closure element 13, as the vertical movement of the transfer device 6 simultaneously causes a vertical movement of the rod 10. If the transfer device 6 and thus the rod 10 is lowered in the direction of the load, the contact between the closure element 13 and the rod 10 is released and the weighing compartment 15 is closed by the closure element 13.

In the second position, which is shown in FIG. 2, the transfer device 6 is lowered in the direction of the load. Arranged in the weighing compartment 15 are the two load-receiving devices 4, 7 as well as the weighing object 5. The weighing object 5 rests completely on the load-receiving device 7 of the transfer device 6. In this position, a zero-balancing operation is performed and in addition, a verification of the proper functioning of the balance and of the weighing parameters can be carried out.

Figure 3:
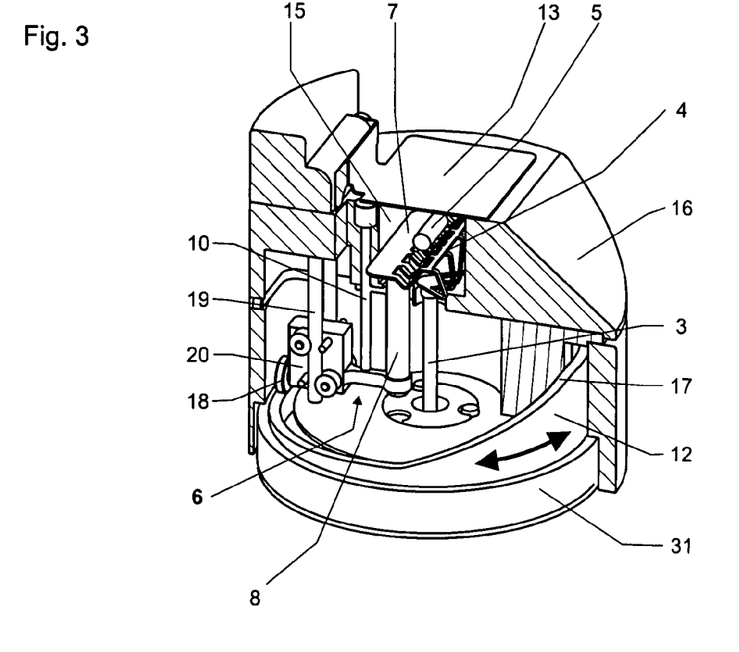
FIG. 3 represents a partial view of an electronic balance with a first draft shield shown in cross-section, with the access opening for the load in the closed condition, and with a transfer device and a load carrier occupying a third position relative to each other.

FIG. 3 illustrates a third position, i.e. the weighing position. The weighing compartment 15 is still closed up. The position-setting member 12 was moved by a further amount, so that the displacement-transmitting element 18 and thus the transfer device 6 have now been lowered by the maximum possible amount in relation to the load carrier. The load-receiving device 7 of the transfer device 6 has moved downward, passing through the load-receiving device 4 of the load carrier 3 without the two load-receiving devices touching each other, whereby the weighing object 5 has been transferred to the load-receiving device 4 of the load carrier 3, so that the weight of the weighing object 5 can be determined.

The three positions shown in FIGS. 1 to 3 are distinguished from each other by the different distances between the load-receiving device 4 and the load-receiving device 7 and also by the fact that the weighing compartment 15 is open or closed. The opening and/or closing of the weighing compartment as well as the distance of the load-receiving devices 4, 7 from each other are controlled by the rotary movement of the position-setting member 12. The position-setting member 12 has substantially the shape of a cylinder which is cut off at an oblique angle at the top with curved transitions, on whose edge 17 the displacement-transmitting element 18 is guided which converts the rotary movement of the position-setting member 12 that is caused by the drive mechanism into a linear vertical movement of the transfer device 6 as well as the rod 10.

The weighing compartment 15 as well as the load-receiving devices 4 and 7 are adapted to the dimensions of the weighing object 5, so that the balance and in particular the weighing compartment 15 can adjust themselves to the ambient environment in the shortest possible time.

Figure 4:
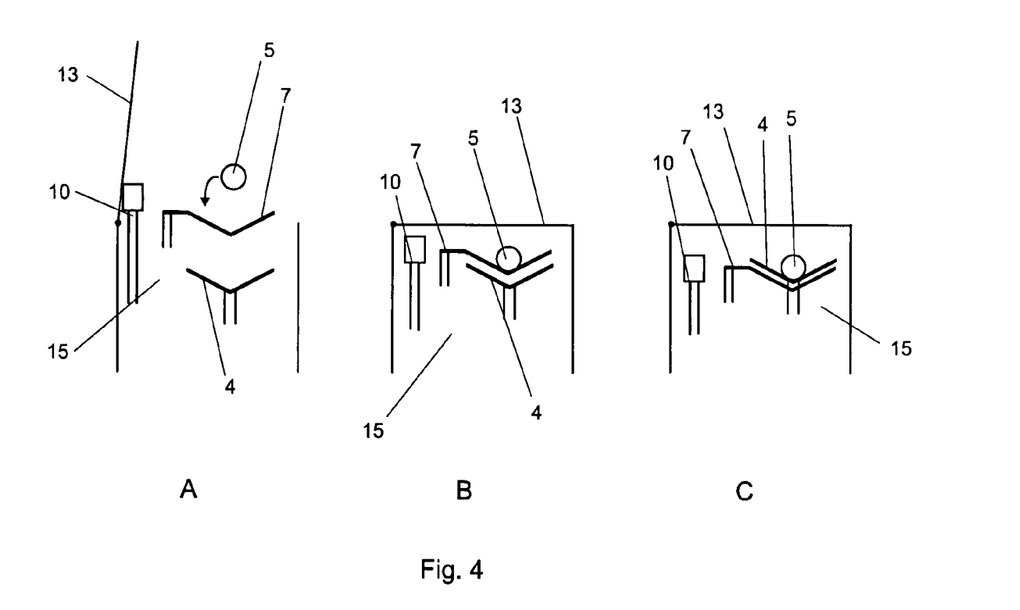
FIG. 4 shows a strongly simplified schematic side view of the load-receiving devices of the load carrier and the transfer device occupying a first, second and third position relative to each other.

The different positions that have already been described in the context of FIGS. 1 to 3, in which the load-receiving device 4 that is connected to the load carrier and the load-receiving device 7 that is connected to the transfer device can be positioned through a movement of the transfer device relative to the load carrier, are shown in a very schematic manner in FIG. 4.

FIG. 4A shows the first position, in which the two load-receiving devices 4, 7 are at maximum distance from each other and the closure element 13 is opened, so that a weighing object 5 can be placed on the load-receiving device 7.

FIG. 4B shows the second position, in which the vertical distance between the load-receiving devices 4, 7 has been reduced by a movement of the transfer device relative to the load carrier, and the weighing compartment 15 has at the same time been closed by the closure element 13. In this position, it is possible to perform the zero-setting of the balance in the load-free condition of the latter.

FIG. 4C illustrates the third position, i.e. the weighing position, where the two load-receiving devices have moved through each other, whereby the weighing object 5 was transferred from the load-receiving device 7 to the load-receiving device 4. The change between the second and the third position takes place with the weighing compartment 15 closed.

In principle, it would also be possible to move either only the load carrier or only the transfer device, or the load carrier as well as the transfer device, with a guided vertical movement of the transfer device being the preferred possibility.

The balance illustrated in FIGS. 1 to 3 has a draft shield 16 which is designed for small weighing objects. FIG. 5 shows a further draft shield with an enlarged weighing compartment 115. The draft shield illustrated here has a holding structure 37 into which a weighing compartment element 36 is inserted which defines the weighing compartment 115 and can be closed with a closure element 113. The balance further has load-receiving devices 104, 107 that are adapted to the size of the weighing object.

If larger articles 105 need to be weighed, it suggests itself to use the two-part draft shield with an exchangeable weighing compartment element 36 and a holding structure 37 as shown in FIG. 5. The weighing compartment element 36 is substantially box-shaped and can be closed by a movable closure element 113. The load-receiving devices 104, 107 can likewise be adapted to the size of the object 105 that needs to be weighed. This exemplary embodiment is particularly well suited for the weighing of objects of different lengths, because dependent on the objects to be weighed, the weighing compartment element 36 as well as the load-receiving devices 104, 107 can simply be exchanged for elements that are adapted in length. For the weighing of wide or differently shaped objects, the entire draft shield, in particular the holding structure 37, the weighing compartment element 36 as well as the closure element 113 can be exchanged if necessary.

Besides the substantially rectangular weighing compartments shown in the drawing figures, it is of course also possible to adapt the weighing compartment as well as the load-receiving devices to arbitrary kinds of weighing objects. The weighing compartment can be configured for example with a substantially triangular, quadratic, polygonal, round and/or oval shape and it is possible to use different kinds of load-receiving devices, including many different load-receiving devices of the known state of the art.

Figure 6:
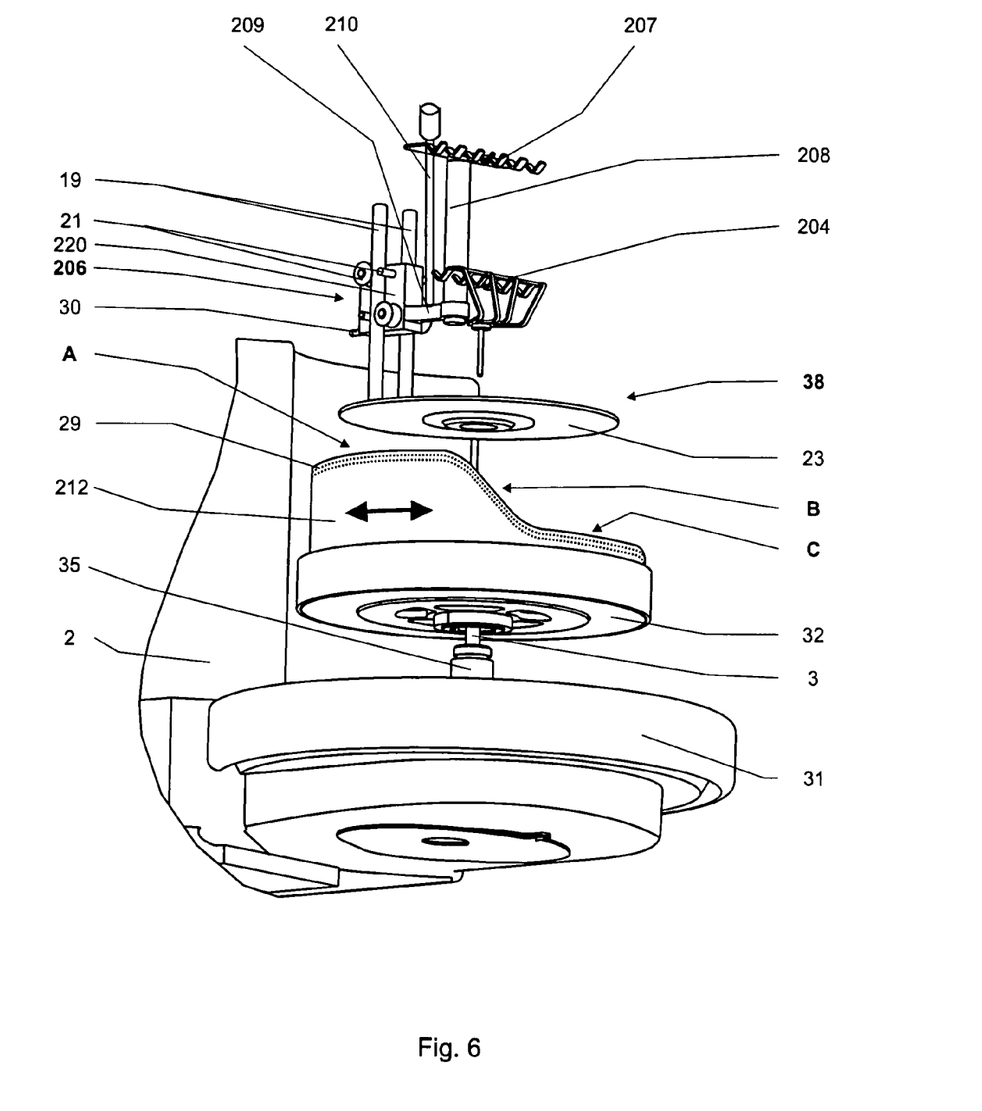
FIG. 6 shows a partial view of an electronic balance with a transfer device, a load carrier and a drive mechanism with a contour wheel and a position-setting member with a guide groove in a schematically simplified exploded drawing format.

In an exploded view, FIG. 6 represents a part of a further exemplary embodiment with an alternative displacement-transmitting element 30 and an alternative position-setting member 212. The illustrated exemplary embodiment can be combined with the design versions shown in FIG. 1 to 5. The support structure 38, the housing 2 as well as the floor element 31 are substantially analogous to the exemplary embodiment shown in FIG. 1.

The load carrier 3 rises up from the floor element 31 and in the assembled state passes through a floor plate 32 of the position-setting member 212 as well as through the floor plate 23 of the support structure 38 and is connected to the load-receiving device 204. Both floor plates 32, 23 therefore have passage openings at their centers. The support structure 38 is connected by means of a guide sleeve 35 for the load carrier 3 in such a way that the position-setting member can be moved independently of the support structure and the floor element 31.

The floor plate 32 of the position-setting member 212 is rotatably constrained and cooperates with the drive mechanism. A suitable drive source is for example a motor arranged in the housing, which is coupled to the position-setting member 212 through one or more drive wheels or gears. The drive wheels are located for example in the floor element 31 and are coupled to the drive motor which is accommodated in the housing 2. This drive source, especially in its mechanical part, substantially resembles the known drive mechanisms which are used for microbalances with a round draft shield.

Two guide rods 19 are fastened at a distance from each other on the floor plate 23. Arranged between the guide rods 19 is a vertically movable guide block 220 which represents a part of the transfer device 206. The guide block 220 is equipped with gliding means 21 in the form of cooperating rollers and pins which are located on the sides of the guide block that face towards the two rods 19 and which guide the vertical movement of the guide block 220 and the transfer unit 206. Further attached to the guide block 220 are an outward-facing displacement-transmitting element 30 which can interact with a groove on the position-setting member 212, and an inward-directed horizontal support 209 to which a vertical support 208 for the load-receiving device 207 as well as a rod 210 serving to actuate the closure element 213 are fastened.

Attached to the floor plate 32 is the position-setting member 212 which is a substantially a rotationally symmetric cylinder section with a wave-shaped free border edge. This illustration gives a clear view of the three different segments A, B, C of the position-setting member, which differ from each other primarily in their vertical height in the direction of the load.

The position-setting member 212 in this example has a groove 29 running parallel to the border edge, with the pin-shaped displacement-transmitting element 30 engaging the groove, which will cause a linear vertical movement of the transfer device 206 as the position-setting member 212 rotates relative to the transfer device. If the displacement-transmitting element 30 is in segment A, the load-receiving device 207 of the transfer device and the load-receiving device of the load carrier 3 are in the first position at the maximally possible distance from each other. In this position, the access opening for the weighing object is open and a weighing object can be put on the transfer device.

When the position-setting member 212 is turned, the displacement-transmitting element 30 moves from segment A to segment B, which causes a downward-directed vertical movement (in reference to the drawing) of the transfer device 206. The load-receiving device 207 of the transfer device 206 moves closer to the load-receiving device 204 of the load carrier 3, but remains at a level above the latter. At the same time, the access opening is closed off by the closure element (see also FIG. 4b). With a further movement of the position-setting member 212, the downward-directed vertical movement continues, so that the two load-receiving devices 204, 207 comb through each other and are moved through each other until the third position has been attained in which the load-receiving device 207 is located below the load-receiving device 204. In the movement from the second to the third position, a weighing objected seated on the transfer device can be transferred to the load-receiving device of the load carrier (see also FIG. 4c). With a continued movement of the position-setting member 212 in the same direction or in the opposite direction, the positions can be changed again, and the position-changing member can be returned from the third position through the second position to the first position.

The load-receiving device 207 as well as the load-receiving device 204 have several hooks spaced apart from each other, on which the weighing object can be placed. The load-receiving devices 204, 207 are configured in such a way that the hooks of one of the load-receiving devices 204, 207 are in centered alignment with the interstices between the hooks of the other load-receiving device, so that with a vertical movement of the transfer device 206 relative to the load carrier 3, the load-receiving devices can comb through each other and the weighing object can be transferred from one load-receiving device to the other.

Figure 7:
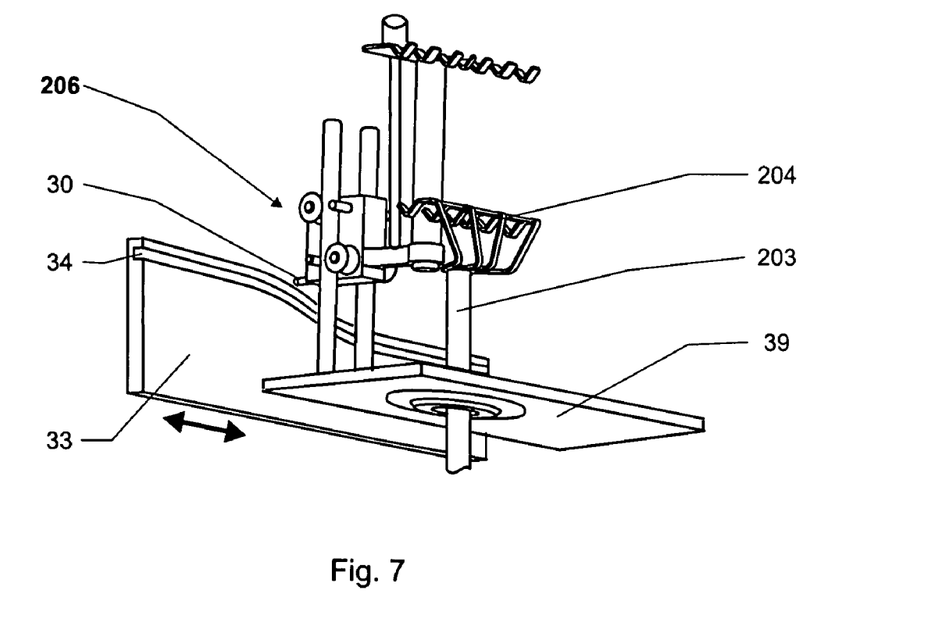
FIG. 7 schematically illustrates a transfer device, a load carrier, a position-setting member configured as a sliding element with a guide groove, and a displacement-transmitting element.

FIG. 7 shows again the transfer device 206 of FIG. 6 as well as its arrangement in relation to a support structure 38 which is in this case of an angular shape, and an alternative version of the position-setting member 33 in the form of a linear slide with a guide groove 34 in which the displacement-transmitting element 30 of the transfer device 206 can be guided. In the arrangement shown in FIG. 7, a vertical movement of the transfer device 206 is driven by a linear horizontal movement of the slide element 33. This arrangement is suited above all for retrofitting to balances with an angular weighing compartment.

Further exemplary embodiments of the position-setting member can also include for example eccentrics or a cam disk that is oriented in a plane parallel to the load direction.

Figure 8:
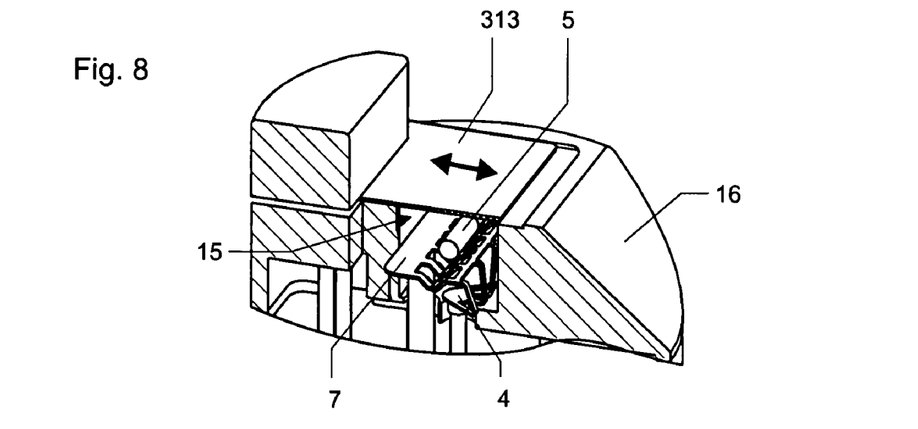
FIG. 8 represents a partial view of an electronic balance shown in cross-section, which comprises a weighing compartment that can be closed by a sliding closure element.

FIG. 8 shows a detail of an electronic balance in a sectional view, essentially analogous to the balance shown in FIGS. 1 to 3, but with an alternative closure element 313 for the weighing compartment 15. The closure element 313 is constrained for linear sliding motion and can be slid over the access opening 14 of the weighing compartment 15. The illustrated version is preferred where the closure element 313 opens by sliding into the draft shield, but of course other directions of opening could be realized as well. The sliding movement of the closure element 313 likewise caused by the drive mechanism which also includes the position-setting member, as the movement of the drive source is converted by suitable means into a pulling- or pushing action.

Figure 9:
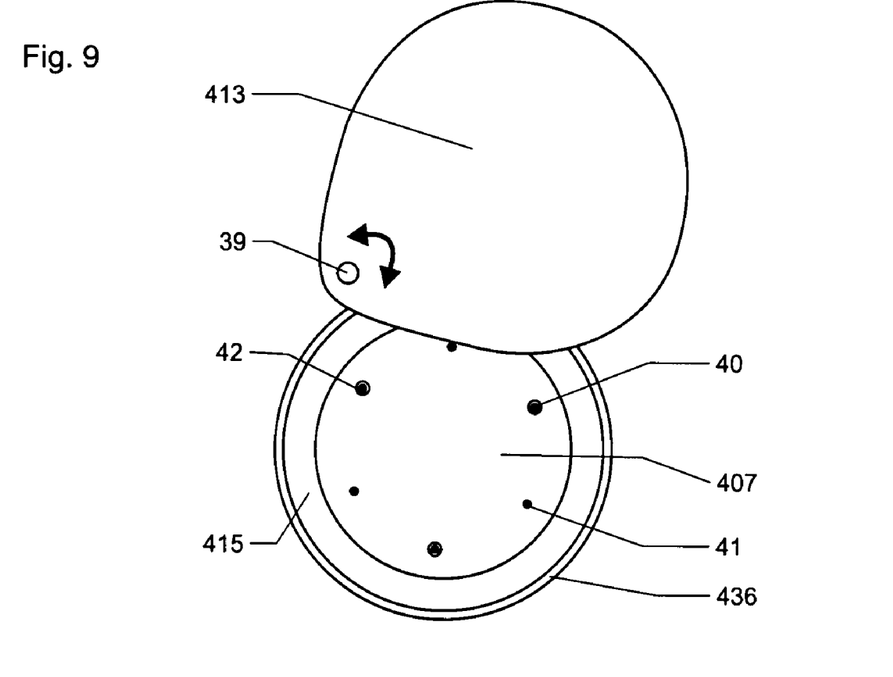
FIG. 9 represents a view directed from above at a substantially round weighing compartment which can be closed off by a rotatably constrained closure element and in which load-receiving devices with seating elements are arranged.
Figure 10:
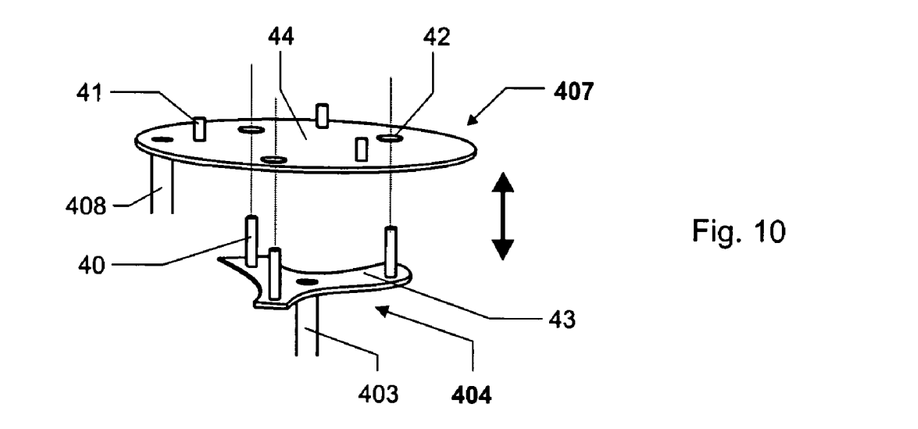
FIG. 10 shows a simplified three-dimensional view of the load-receiving devices of FIG. 9.

A further configuration of the weighing compartment 415, of the load-receiving devices 404, 407 and of the closure element 413, designed specifically for the weighing of disk-shaped objects is illustrated in FIGS. 9 and 10. FIG. 9 shows a weighing compartment 415 that is enclosed by a substantially round weighing compartment element 436. The weighing compartment 415 can be opened and/or closed by means of a closure element 413, which is fastened on the draft shield (not shown here) with the freedom to rotate about a fastening means 39. The opening and/or closing of the closure element is coupled to the movement of the position-setting member and the drive mechanism that is coupled to it. The coupling can be realized for example by way of a rotatable driving axle which is connected to the center of rotation of the closure element 413 and connected through a suitable actuating element to the drive source. The actuating element can for example be a gear wheel which engages a suitable guiding feature on the position-setting member.

Arranged inside the weighing compartment 415 are the load-receiving device 407 of the transfer device and the load-receiving device 404 of the load carrier 403. The load-receiving device 407 has at least three stand-off seating elements 41 as well as at least three passage openings 42 through which the seating elements 40 of the load-receiving device 404 can move when the load-receiving devices 404, 407 are moved relative to each other.

The load-receiving devices 404, 407 are shown in FIG. 10 in a schematic three-dimensional representation. Connected to the load carrier 403 is the load-receiving device 404, and the load-receiving device 407 is connected through a vertical support 408 to a transfer device. The load-receiving device 404 has a propeller-shaped base plate 43, on which at least three seating elements 40 are mounted. The load-receiving device 407 can be of an analogous configuration as the load-receiving device 404 and arranged with an angular offset relative to the latter, or it can be configured as shown here as a plate 44 with passage openings 42 for the seating elements 40, and optionally, with at least three seating elements 41. Of course, it is also possible that both of the load-receiving devices 404, 407 are of plate-shaped configuration. The seating elements 41 are shorter than the seating elements 40, so that with one of the load-receiving devices 404, 407 reaching through the other, a weighing object can be set down on, or lifted off from, the load-receiving device 404 that is connected to the load carrier 403. The weighing object is supported on substantially point-shaped contact locations of the seating elements 40, 41.

Figure 11:
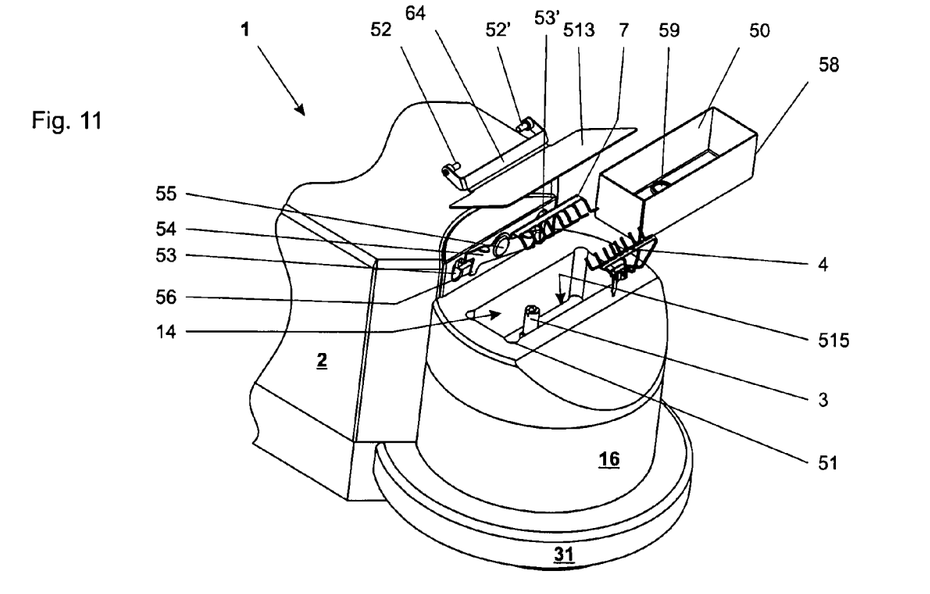
FIG. 11 represents an exploded view of an electronic balance with a draft shield, which comprise an exchangeable closure element, an exchangeable inset as well as exchangeable load-receiving devices.

FIG. 11 shows in an exploded view an electronic balance 1 with a draft shield 16, which is equipped with an exchangeable closure element 513, an exchangeable inset 50, as well as an exchangeable first load-receiving device 4 and an exchangeable second load-receiving device 7. FIG. 11 illustrates in particular the elements of the balance 1 which are exchangeable so that they can be easily cleaned. For a more detailed description of the structural configuration and the function of a representative electronic balance, the reader is referred to the description of FIGS. 1 to 3.

The draft shield 16 encloses a weighing compartment 515 which has a loading access opening 14. A load carrier 3 and a transfer device (not visible in this drawing) are arranged at least in part in the weighing compartment 515 (also see FIG. 1).

The weighing compartment 515 is in this example of a substantially rectangular shape, wherein at least one corner (in this example all four corners) has in addition a round recess 51.

The inset 50 is adapted to the shape and dimensions of the weighing compartment 515, except that the inset 50 has nearly right angles at the corners 58, so that when the inset 50 is set into the weighing compartment 515, the recesses 51 remain free in the sense that they are not filled out by the inset 50, so that a gripping means such as a pair of tweezers or an appropriately configured automated unit can get a grip on the wall of the inset 50 for insertion or removal.

The inset 50 further has two passage openings 59 (only one of them visible in the drawing), through which the load carrier 3 and the transfer unit reach into the weighing compartment 515 when the inset 50 is seated in the weighing compartment 515.

At the end of the closure element 513 that faces towards a housing 2 of the balance 1, the closure element 513 has two coupling parts 52, 52'. The coupling parts 52, 52' are pointing inward in relation to the contours of the closure element 513 and are shaped so that the closure element 513 can perform a swivel movement in which the axis extending between the two coupling parts 52, 52' forms the axis of rotation.

At least one recess 53, 53' serves to connect the closure element 513 to the balance 1 and specifically to the housing 2, represented in the illustrated exemplary embodiment by two recesses 53, 53' arranged with mirror symmetry relative to each other.

A latching device 54 is arranged between the two recesses 53, 53', designed so that it can partially cover the recesses 53, 53' and thereby secure the closure element 513, more specifically the coupling parts 52, 52' in the recesses 53, 53'. The latching device 54 has substantially the shape of a bar that is constrained so that it can swivel about a point of rotation 55. The latching device 54 further has at least one handle 57 and a resting contact 56 which in the closed position (see FIG. 12) rests against a surface of the draft shield 16.

Figures 12A, 12B, 13:
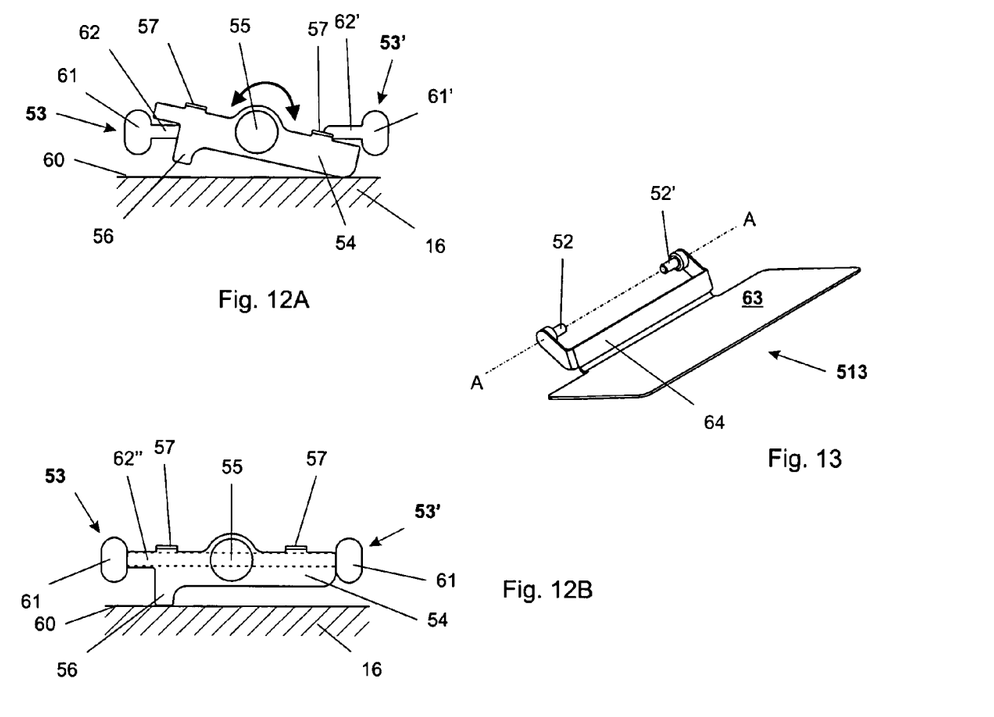

The latching device 54 and the way it works together with the at least one recess 53, 53' is illustrated in FIGS. 12a and 12b. FIG. 12a shows the latching device 54 in the open position, and FIG. 12b shows the closed position. In the open position, the closure element can be set in place or removed, while the latching device 54 in its closed position secures or locks the closure element.

In the open position, the longitudinal axis of the latching device 54 is slanted at an angle to the surface 60 of the draft shield 16, and the resting contact 56 is removed from the surface 60. The latching device 54 is arranged in front of the recesses 53, 53', each of which consists of two recess portions 61, 61', 62, 62' whose longitudinal axes are oriented at 90° to each other. In the open position, the coupling parts 52, 52' (see FIG. 11) can be set into the recesses 53, 53', so that the recess portions 62 and 62' serve as bearings for the free ends of the coupling parts 52, 52', and the closure element in its installed condition can be swiveled about the connector axis of the two coupling parts 52, 52'.

The switch from the open position of the latching device 54 as shown in FIG. 12A to the closed position shown in FIG. 12B occurs by turning the bar-shaped latching device about the point of rotation 55. The turning movement is stopped when the resting contact 56 comes to rest against the surface 60.

The latching device 54 can be turned manually, or it can be automated with an appropriate gripping means engaging the handle 57 of the latching device 54 and turning the mechanism 54.

In the closed position, the latching device 54 covers the recess portion 62'' which in FIG. 12b has the shape of an uninterrupted connection between the two recess portions 61, 61', and if the closure element has been set in place it is thereby secured.

The closure element 513 is shown in a perspective view in FIG. 13. The closure element 513 includes a plate 63 which can close the loading access opening of the weighing compartment, and a connector strip 64 bent up at an angle, on which the coupling parts 52, 52' are arranged. The coupling parts 52, 52' are configured in the shape of pins with a diameter that is slightly smaller than the diameter of the recess portion 62, 62' (see FIG. 12). Further shown in FIG. 13 is the previously mentioned axis of rotation AA of the closure element 513, which is represented by the connecting axis between the coupling parts 52, 52'.

It is particularly advantageous if an electronic balance allows a choice between using a conventional draft shield or a draft shield according to the present disclosure. This concept of interchangeability suggests itself in particular if the conventional draft shield and the draft shield of the disclosure have the same dimensions and can be operated with the same kind of drive mechanism.

It is further advantageous to not only select an appropriate draft shield to adapt the weighing compartment to a specific object that is to be weighed, but to also adapt the dimensions and the shape of the load-receiving devices of the transfer device and of the load carrier to a specific weighing object. It is also conceivable to equip the weighing compartment with further loading access openings, or to arrange the loading access openings at another location, for example laterally.

Besides the weighing compartments shown in the drawing figures, it is of course also possible to adapt the weighing compartment, the closure element, the inset as well as the load-receiving devices to arbitrary kinds of weighing objects. The weighing compartment can be configured for example with a substantially triangular, quadratic, polygonal, round and/or oval shape and it is possible to use different kinds of load-receiving devices, including many different load-receiving devices of the known state of the art.

The closure elements for these types of weighing compartments can likewise be equipped with coupling parts, so that they can be interchangeably connected to the balance.

It is also conceivable to equip the weighing compartment with further loading access openings, or to arrange the loading access openings at another location, for example laterally.

LIST OF REFERENCE SYMBOLS 1 balance
2 housing
3, 203, 403 load carrier
4, 104, 404 first load-receiving device
5, 105 weighing object
6, 206 transfer device
7, 207, 407 second load-receiving device
8, 208, 408 vertical support
9, 209 horizontal support
10, 210 rod
11 wall element
12, 212 position-setting member
13, 113, 313, 413, 513 closure element
14 loading access opening
15, 115, 415, 515 weighing compartment
16 draft shield
17, 117 edge
18 displacement-transmitting element, roller 19 guide rod
20, 220 guide block
21 gliding means
23 floor plate
24 passage
25 cover
28 wall element
29 groove
30 displacement-transmitting element
31 floor element
32 floor plate
33 position-setting member
34 groove
35 guide sleeve
36, 436 weighing compartment element
37 holding structure
38 support structure
39 fastening means
40 seating element
41 seating element
42 passage opening
43 base plate of 404
50 inset
51 recess, cut-back area
52, 52' coupling part
53, 53' recess
54 latching device
55 point of rotation
56 resting contact
57 handle
58 corner
59 passage opening
60 surface
61, 61' recess portion
62, 62' recess portion
62" recess portion
63 plate
64 connector strip

What is claimed is:

1. Electronic balance with a load carrier, further with a transfer device cooperating with the load carrier, with a draft shield enclosing a weighing compartment that is adapted to the dimension of an object to be weighed and comprises at least one closure element serving to open and close at least one loading access opening, and also with a drive mechanism serving to actuate the closure element, wherein the drive mechanism further comprises a position-setting member, wherein the drive mechanism together with the position-setting member and a displacement-transmitting element causes a lifting- and lowering movement of the transfer device relative to the load carrier, and wherein the position-setting member is configured for setting the transfer device and/or the load carrier into several defined positions.

2. Electronic balance according to claim 1, wherein the displacement-transmitting element is fastened to the transfer device.

3. Electronic balance with a load carrier, further with a transfer device cooperating with the load carrier, with a draft shield enclosing a weighing compartment that is adapted to the dimension of an object to be weighed and comprises at least one closure element serving to open and close at least one loading access opening, and also with a drive mechanism serving to actuate the closure element, wherein the drive mechanism further comprises a position-setting member, configured as a cam disk wherein the drive mechanism together with the position-setting member and a displacement-transmitting element causes a lifting- and lowering movement of the transfer device relative to the load carrier, and wherein the position-setting member is configured for setting the transfer device and/or the load carrier into several defined positions.

4. Electronic balance according to claim 1, wherein the position-setting member is configured as a linear-displacement sliding element.

5. Electronic balance according to claim 1, wherein the position-setting member comprises a guiding path for a displacement-transmitting element.

6. Electronic balance according to claim 1, wherein the load carrier comprises a first load-receiving device and the transfer device comprises a second load-receiving device, wherein the load-receiving devices are of a configuration which allows the first load-receiving device and the second load-receiving device to move without contact through each other for transferring a weighing load when the load carrier moves in relation to the transfer device.

7. Electronic balance according to claim 1, wherein the weighing compartment comprises a substantially triangular, rectangular, polygonal, round, or oval shape.

8. Electronic balance according to claim 1, wherein the closure element is supported so that it can swivel or slide relative to an axis or a center or rotation.

9. Electronic balance according to claim 1, wherein the electronic balance is configured for the weighing of loads in the microgram range and/or sub-microgram range.

10. Electronic balance according to claim 1, wherein the weighing compartment comprises an inset, wherein the loading access opening of the weighing compartment can be closed with a closure element, an wherein during the weighing process the first load-receiving device and the second load-receiving device are disposed in the inset, and wherein the inset and/or the closure element can be exchanged manually or in an automated mode.

11. Electronic balance according to claim 10, wherein the closure element comprises at least one coupling part and that the balance comprises at least one recess to accommodate the at least one coupling part.

12. Electronic balance according to claim 11, wherein the coupling part can be secured in the recess with a latching device.

13. Electronic balance according to claim 10, wherein the weighing compartment comprises at least one cut-back area serving to insert or remove the inset.

14. Method of placing a weighing object on an electronic balance with a draft shield that encloses a weighing compartment adapted to a specific weighing object and comprises at least one loading access opening that can be closed with a closure element, further with a drive mechanism which actuates the closure element and also includes a position-setting member, and further with a transfer device which cooperates with a load carrier and also cooperates through a displacement-transmitting element with the position-setting member, wherein the method comprises the following steps:
 a. opening the loading access opening by actuating the closure element and simultaneously setting a first position between the load carrier and the transfer device by moving them relative to each other by means of the drive mechanism;
 b. arranging a load on the transfer device;
 c. closing the loading-access opening and simultaneously setting a second position between the load carrier and the transfer device by moving them relative to each other;
 d. performing the zero point adjustment of the balance;

e. transferring the load from the load-receiving device of the transfer device to the load-receiving device of the load carrier by moving the load carrier and the transfer device into a third position relative to each other;
f. weighing the load;
g. transferring the load from the load carrier to the transfer device by moving the transfer device and the load carrier relative to each other into the second position;
h. opening the loading access opening and simultaneously setting a first position between the load carrier and the transfer device by moving them relative to each other;
i. removing the load from the transfer device;

wherein the actuation of the closure element and the setting of at least the first, second and third position between the load carrier and the transfer device occurs by way of a cooperation of the drive mechanism, the position-setting member and the displacement-transmitting element.

15. Method according to claim 14, wherein the steps d to g are repeated until a predetermined number of repetitive weighings has been completed.

16. Method according to claim 14, wherein before and/or after the zero-setting of the balance, the capability of the balance to function correctly is verified and/or the weighing parameters are verified and/or adjusted.

17. Method according to claim 14, wherein the placing and/or removing of the load on the transfer device occurs in an automated manner.

18. Electronic balance according to claim 3, wherein the position-setting member comprises a guiding path for a displacement-transmitting element.

19. Electronic balance according to claim 4, wherein the position-setting member comprises a guiding path for a displacement-transmitting element.

20. Electronic balance according to claim 5, wherein the load carrier comprises a first load-receiving device and the transfer device comprises a second load-receiving device, wherein the load-receiving devices are of a configuration which allows the first load-receiving device and the second load-receiving device to move without contact through each other for transferring a weighing load when the load carrier moves in relation to the transfer device.

21. A method of weighing an object based on an electronic balance with a draft shield that encloses a weighing compartment, the method comprising:
open a loading-access opening by actuating a closure element and set a first position between a load carrier and a transfer device by moving them relative to each other;
arrange a load on the transfer device;
close the loading-access opening and set a second position between the load carrier and the transfer device by moving them relative to each other;
perform a zero point adjustment of the balance;
transfer the load from a load-receiving device of the transfer device to a load-receiving device of the load carrier by moving the load carrier and the transfer device into a third position relative to each other;
weigh the load;
transfer the load from the load carrier to the transfer device by moving the transfer device and the load carrier relative to each other into the second position;
open the loading-access opening and set a first position between the load carrier and the transfer device by moving them relative to each other; and
remove the load from the transfer device, wherein the actuation of the closure element and the setting of the positions between the load carrier and the transfer device are based on a drive mechanism.

* * * * *

UNITED STATES PATENT AND TRADEMARK OFFICE
CERTIFICATE OF CORRECTION

PATENT NO. : 7,560,651 B2  Page 1 of 1
APPLICATION NO. : 11/907051
DATED : July 14, 2009
INVENTOR(S) : Bruno Nufer et al.

It is certified that error appears in the above-identified patent and that said Letters Patent is hereby corrected as shown below:

Claim 10: Line 3:   insert --and-- after the phrase "closure element, an"

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO.         : 7,560,651 B2
APPLICATION NO.    : 11/907051
DATED              : July 14, 2009
INVENTOR(S)        : Bruno Nufer et al.

Page 1 of 1

It is certified that error appears in the above-identified patent and that said Letters Patent is hereby corrected as shown below:

Column 16, Claim 10: Line 31:    insert --and-- after the phrase "closure element, an"

This certificate supersedes the Certificate of Correction issued November 24, 2009.

Signed and Sealed this

Fifteenth Day of December, 2009

David J. Kappos
*Director of the United States Patent and Trademark Office*